United States Patent Office 2,969,338
Patented Jan. 24, 1961

2,969,338

POLYESTER CONTAINING ESTER OF LEVULINIC ACID AND PENTAERYTHRITOL WITH POLYMERIZED POLYCARBOXYLIC ACID

John A. Parker, Lancaster Township, Lancaster County, Pa., assignor to Armstrong Cork Company, Lancaster, Pa., a corporation of Pennsylvania No Drawing. Filed May 1, 1959, Ser. No. 810,228

9 Claims. (Cl. 260—22)

This invention relates generally to resilient flooring and more particularly to a binder system suitable for use in resilient flooring. Still more particularly the invention relates to a carefully tailored, non-oxidizable keto-ester polyester system having outstanding properties as a binder for resilient floorings.

Long-wearing resilient floorings these days are generally of two types. The first type is the well-known linoleum, the binder system of which is prepared by the oxidation of siccative fatty acid esters in the presence of rosin. The second type of long-wearing resilient flooring is the so-called plastic flooring, the wearing surface of which comprises a thermoplastic synthetic resin such as polyvinyl chloride, vinyl chloride-vinyl acetate copolymers, or other vinyl compositions. Each of the two types of resilient floorings possesses its own desirable properties and characteristics, and each has its own shortcomings.

There has not yet been developed a resilient flooring which possesses properties intermediate between those of linoleum and the so-called plastic flooring.

It is the primary object of the present invention to supply such an intermediate flooring. It is a further object of the present invention to supply a resilient flooring which possesses the alkali resistance not possessed by linoleum. It is still another object to supply a flooring in light colors which will not exhibit the traffic staining phenomenon exhibited by plastic floorings. It is a further object of the present invention to present a flexible resilient flooring having a non-oxidizable binder in which light pastels and white pigmenting can be used without affecting alkali resistance, wear resistance, and other stringent properties requisite for a usable floor covering.

These objects have been accomplished in a surprisingly effective manner. The invention contemplates reacting certain glycols and isophthalic acid to form a glycol isophthalate polyester having an acid number in the range of 10-40. This polyester is admixed either with the monoester of pentaerythritol and levulinic acid, or with a mixture of levulinic acid and pentaerythritol containing sufficient levulinic acid to form the monoester; this mixture will contain 0–0.6 molal excess of pentaerythritol. The resulting mixture will contain 50–80% by weight of the polyester, and accordingly, 20–50% by weight of the pentaerythritol monoester or the ingredients therefor. To the resulting mixture is added an aliphatic polycarboxylic acid containing at least 36 carbon atoms. The amount of the polycarboxylic acid to be added will be in the range of 40–60% by weight of the total reaction mixture. This final reaction mixture is then heated at a temperature in the range of about 150°–225° C. to produce a gel. The acid number of the gel will generally be in the range of 46 to 52. This gel is the desired plastic binder system.

The first component in the process of the present invention is the polyester prepared by reacting the glycol and isphthalic acid. The glycol must be selected from the group consisting of 1,3-butanediol, neopentyl glycol, diethylene glycol, or ethylene glycol. The glycol must be reacted with isophthalic acid. The ratio of amounts of glycol and isophthalic acid is such to produce a polyester having an acid number in the range of 10–40 and more preferably in the range of 20–30. The polyester is prepared by known processes. The glycol and the acid are admixed and maintained at temperatures in the range of about 300°–450° F. until the requisite acid number is reached. Longer times will be required at lower temperatures, about 25 hours being required at a temperature of about 400° F. In accordance with the usual polyester techniques it is preferred to maintain an inert gas flow, such as carbon dioxide, through the mixture while heat is being applied. The gas flow aids in sweeping water of condensation out of the mixture and thus furthers the reaction. At the end of the reaction the resulting polyester will be found to be a liquid at a temperature of about 400° F., and a solid at room temperature. The liquid may be utilized immediately as such in the next step of the process. Alternatively the liquid may be poured into pans, cooled, broken up, and stored until needed subsequently.

The next step of the procedure involves the reaction of the glycol isophthalate with either pentaerythritol monoesterified with levulinic acid, or the ingredients for making the monoester. No particular advantage is obtained one way or the other. The pentaerythritol monoester is readily prepared by admixing the pentaerythritol and the levulinic acid and heating the mixture with stirring, generally in the temperature range of 300°–400° F. to a final acid number in the range of 18 to 23. In making the pentaerythritol monoester, approximately one mole of levulinic acid will be used for every mole of pentaerythritol. If the levulinic acid and pentaerythritol are to be used as such instead of in the form of the monoester, the same relative amounts of levulinic acid and pentaerythritol should be used as would be required if the monoester were to be formed. The description henceforth will proceed as if the monoester were used.

The relative amounts of the glycol isophthalate polyester and the pentaerythritol monoester should be such that the mixture of the two contains 50–80% by weight of the glycol isophthalate polyester and accordingly 20–50% by weight of the pentaerythritol monoester.

The final ingredient to be added to the mixture of the polyester and the pentaerythritol monoester is the aliphatic polycarboxylic acid containing at least 36 carbon atoms. These acids are best illustrated by the dimerized and trimerized fatty acids which are readily available in commerce. Such acids are prepared by the thermopolymerization of drying oil acids carried out in a pressure vessel in the presence of water in the form of steam. The resulting compositions generally contain on the average about 3% monomer, 75% dimer, and 22% trimer. Such a product is known as dimerized fatty acids and will have an iodine value of approximately 90, and an acid number of approximately 190. The dimerized acid itself is essentially a 36-carbon dicarboxylic acid obtained by dimerization of the linoleic acid of soya, cottonseed, corn, and linseed oils of commerce. The product may be referred to as dilinoleic acid. This dimerized acid product may be purchased under the name "Empol 1022." It is apparent that the dimerized acids and the trimerized acids resulting from the above-described pressurized process or its equivalent may be separated or further concentrated as desired. Thus the trimer acid may be purchased as such. The trimer acid is a 54-carbon acid and contains a plurality of carboxylic acid groups. As a further variation on the dimer and trimer acids, any residual unsaturation in the carbon chain may be eliminated by hydrogenation. The hydrogenated dimer acid may be purchased under the name "Emery 3020-S"; the predominantly straight trimer acid may be purchased under the name "Emery 3055-S." These polymerized fatty acids described above are pre-eminently suitable in the present invention and constitute a preferred embodiment thereof, particularly in unsaturated form.

The amount of the aliphatic polycarboxylic acid containing at least 36 carbon atoms to be added to the mixture of the glycol isophthalate polyester and the pentaerythritol monoester will be such that the final reaction mixture contains 40-60% by weight of the polycarboxylic acid and correspondingly 60-40% by weight of the total, final reaction mixture of the polyester plus the pentaerythritol monoester. This mixture will be heated to a temperature in the range of about 150°-225° C. until gelation occurs. Preferably an inert gas flow such as carbon dioxide will be maintained through the heated reaction mixture in order to sweep out water of condensation as it forms. Longer times will be required at lower temperatures, and at a temperature of about 175° C., the time required will be about 6 hours.

As mentioned above, the end point of this final reaction is that point at which the mixed keto-ester forms a gel. This gel is readily detectable when it forms since the reaction mixture stiffens and the final viscosity approaches infinity.

The resulting product is pre-eminently suitable as the binder system for surface covering materials. The keto-ester binder system may be formulated with fillers and pigments in the usual mixers, deposited in sheet or particle form on any of the usual backings of burlap, cellulosic felt, asbestos felt and calendered or otherwise hot-pressed onto the backing to form sheet goods ready to be subjected to the final curing operation.

The curing of the sheet goods may be carried out in the usual manner of linoleum curing by mere stoving at an elevated temperature in the range of 180°-240° F. However, the binder system of the present invention lends itself readily to a technique of accelerated curing. Accordingly, it is preferred that a curing accelerator be incorporated into the keto-ester polyester cement at the time at the time when fillers and binders are admixed therewith. The preferred accelerator is that set forth in application Serial No. 593,336, filed June 25, 1956, now U.S. Patent No. 2,912,395. As defined in that copending application, the preferred accelerators may be defined as those having the formula

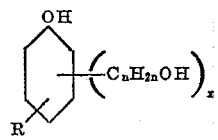

wherein $n$ is an integer from 1 to 2 inclusive, $x$ is an integer from 2 to 4 inclusive, and R is selected from the group consisting of $C_yH_{2y+1}$—and

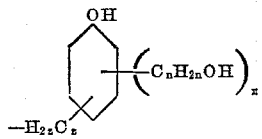

wherein $y$ is an integer from 1 to 30 inclusive, preferably 1 to 8 inclusive, $z$ is an integer from 1 to 5 inclusive, and $n$ and $x$ have the meanings assigned above. Preferably R and $C_zH_{2z}$— will be in the position para to the phenolic OH group.

The preferred monomeric accelerator as defined in the above-described patent application is the compound 2,2-bis-(3,5-dimethylol, 4-hydroxy phenyl)-propane. This preferred compound is prepared by the low temperature (less than 40° C.) reaction of at least four moles of formaldehyde with one mole of the bis phenol, 2,2-bis-(4-hydroxy phenyl)-propane, under alkaline conditions, followed by acidification and washing to produce the tetramethylol bis phenol product.

These preferred accelerators are used in an amount of 3-15% by weight based on the weight of the mixed polyester. Amounts of the accelerator less than 3% by weight are too small to produce any significant effect, while amounts larger than 15% by weight unduly stiffen the resulting product. The mechanism reaction between the accelerator and the mixed polyester is not understood. Apparently, however, the accelerator participates in some manner in curing or cross-linking reactions which proceed at the elevated temperatures encountered under stoving conditions.

It is one of the features of the mixed polyester cement of the present invention that a tough, strong, unusually light-colored flooring product can be made therefrom. It is postulated that the key to the success of the mixed polyester lies in the carbonyl group present from the leculinic acid. Work done to prepare mixed polyester cements identical with those described above save that the carbonyl group was absent is ineffective to produce a composition even approaching that suitable for flooring materials.

A representative formula of a flooring material utilizing the keto-ester binder system of the present invention along with a curing accelerator is as follows:

| Ingredients: | Parts by weight |
| --- | --- |
| Mixed polyester gel binder | 12.4 |
| Finely-divided calcium carbonate | 21.4 |
| Hydrated silica | 2.4 |
| Fibrous talc | 7.2 |
| Pigments | 5.0 |
| 2,2-bis-(3,5-dimethylol, 4-hydroxy phenyl)-propane | 1.3 |

The following examples show several embodiments of the present invention. All parts are by weight unless otherwise stated.

*Example 1*

Into a reaction vessel equipped with the thermometer, stirrer, gas inlet tube, and take-off condenser were placed 237 parts 1,3-butanediol and 363 parts isophthalic acid. A temperature of 380° F. was maintained for 14 hours while carbon dioxide was bubbled through the mixture. Reaction was stopped by cooling when the acid number reached 25 and the hydroxyl number reached 48.5.

Into a reaction vessel similar to that described above was placed 268 parts of the 1,3-butylene isophthalate prepared as described above, 102 parts pentaerythritol, 79 parts levulinic acid, and 765 parts dimerized acid (Empol 1022). The mixture was heated at 175° C. under a carbon dioxide gas flow with stirring until gelation occurred. The brownish, jelly-like material was poured into a tray to cool.

Utilizing the keto-ester polyester gel prepared as described above, a flooring composition was prepared with the following ingredients:

| Ingredients: | Parts |
| --- | --- |
| Polyester gel binder | 204 |
| Finely-divided calcium carbonate | 51 |
| Asbestos | 180 |
| Finely-divided silicon dioxide | 60 |
| Kaolin clay | 36 |
| 2,2-bis-(3,5-dimethylol, 4-hydroxyl phenyl)-propane | 36 |

The binder and fillers were mixed at about 260° F. on a two-roll mill and finally sheeted off to 0.070" at about 180° F. The sheets were given a brief cure for five hours at 160° F. and then cured to an indentation of 20% in 70 hours at 200° F. A tough, resilient flooring of excellent white color was obtained.

*Example 2*

Into a reactor as described in Example 1 were placed 119 parts pentaerythritol and 81 parts levulinic acid. The mixture was heated with stirring at 175° C. with a carbon dioxide flow therethrough for a total reaction time of three hours. The final acid number was 23.

Into a reactor are placed 187.5 parts of the monoesterified pentaerythritol prepared as described above and 210 parts of the polyester 1,3-butylene isophthalate prepared as described in Example 1 and having an acid number of 25 and a hydroxyl number of 48.5. The mixture was heated for one hour at 200° C. under a carbon dioxide blanket. There was then added 817 parts dimerized acid (dilinoleic acid) and the mixture was maintained at 200° C. until gelation occurred. About 6 hours were required.

When this keto-ester binder system was formulated into a flooring composition, a tough, strong flooring resulted having excellent alkali resistance. No traffic staining occurs under actual traffic tests.

*Example 3*

Into a reaction vessel equipped as previously described were placed 1848 parts neopentyl glycol and 1992 parts isophthalic acid. A temperature of 400° F. was maintained for 5 hours while $CO_2$ was bubbled through the mixture. The reaction was stopped by cooling when the acid and hydroxyl numbers reached 3 and 165 respectively.

Into a reactor are placed 187.5 parts of the monoesterified pentaerythritol prepared as described previously and 109 parts of the neopentyl isophthalate. This mixture was heated at 200° C. for 1 hour under $CO_2$. There was then added 817 parts dimerized acid, and the mixture was maintained at 175° C. under $CO_2$ until gelation occurred. The time required was 5.5 hours.

Into a reactor are placed 187.5 parts of the monoesterified pentaerythritol prepared as described previously and 210 parts of the neopentyl isophthalate. This mixture was heated for 1 hour at 200$ C. under $CO_2$. There was then added 817 parts dimerized acid, and the mixture was maintained at 175° C. under $CO_2$ until gelation occurred. The time required was 5.5 hours.

Into a reactor are placed 187.5 parts of the monoesterified pentaerythritol prepared as described previously and 210 parts of the neopentyl isophthalate. This mixture was heated for 1 hour at 200° C. under $CO_2$. There was then added 817 parts dimerized acid, and the mixture was maintained at 175° C. under $CO_2$ until gelation occurred. The time required was 6 hours. A tough, light-colored flooring was prepared using the cooled gel as a binder.

*Example 4*

Into a reaction vessel were placed 1602 parts neopentyl glycol and 2324 parts isophthalic acid. A temperature of 395° F. was maintained for 26 hours while $CO_2$ was bubbled through the mixture. The reaction was stopped by cooling when the acid and hydroxyl numbers reached 26 and 43 respectively.

Into a reactor were placed 187.5 parts of the monoesterified pentaerythritol and 229 parts neopentyl isophthalate. This mixture was heated for 1 hour at 200° C. under $CO_2$. There was then added 817 parts dimerized acid, and the mixture was maintained at 175° C. under $CO_2$ until gelation occurred. The time required was 6 hours. An excellent binder resulted.

I claim:

1. The method of making a non-oxidizable keto-ester binder system for resilient flooring comprising reacting isophthalic acid and a glycol selected from the group consisting of 1,3-butylene glycol, neopentyl glycol, ethylene glycol, and diethylene glycol, to form a polyester having an acid number in the range of 10–40, admixing with said polyester a material selected from the group consisting of the pentaerythritol monoester of levulinic acid, and the ingredients for forming said monoester, the resulting mixture containing about 50–80% by weight of said polyester, adding to said resulting mixture an aliphatic, polycarboxylic, polymerized, fatty acid containing at least 36 carbon atoms in an amount of 40–60% by weight of said polycarboxylic acid based on the total weight of the mixture, and heating the final reaction mixture to a temperature in the range of 150°–225° C. to produce a gel.

2. The method according to claim 1 wherein said glycol comprises 1,3-butanediol.

3. The method according to claim 1 wherein said polyester has an acid number of about 25.

4. The method according to claim 1 wherein said material comprises the monoester of levulinic acid and pentaerythritol.

5. The method according to claim 1 wherein said polycarboxylic acid comprises dilinoleic acid.

6. A synthetic binder system for resilient flooring prepared by reacting isophthalic acid and a glycol selected from the group consisting of 1,3-butylene glycol, neopentyl glycol, ethylene glycol, and diethylene glycol, to form a polyester having an acid number in the range of 10–40, admixing said polyester with a material selected from the group consisting of the monoester of levulinic acid and pentaerythritol, and the ingredients for forming said monoester, the resulting mixture containing about 50–80% by weight of said polyester, adding to said resulting mixture an aliphatic polycarboxylic, polymerized, fatty acid containing at least 36 carbon atoms in an amount sufficient to form a mixture containing about 40–60% by weight of said polycarboxylic acid based on the total weight of the mixture, and heating the resulting reaction mixture to a temperature in the range of about 150°–225° C. to produce a gel.

7. The product according to claim 6 wherein said glycol is 1,3-butanediol.

8. The product according to claim 6 wherein said material comprises the monoester of pentaerythritol and levulinic acid.

9. The product according to claim 6 wherein said polycarboxylic acid comprises dilinoleic acid.

References Cited in the file of this patent

UNITED STATES PATENTS

| | | |
|---|---|---|
| 2,895,932 | Schlatter et al. | July 21, 1959 |
| 2,907,736 | Greenlee | Oct. 6, 1959 |

UNITED STATES PATENT OFFICE
CERTIFICATION OF CORRECTION

Patent No. 2,969,338

January 24, 1961

John A. Parker

It is hereby certified that error appears in the above numbered patent requiring correction and that the said Letters Patent should read as corrected below.

Column 3, line 41, strike out "at the time"; column 4, line 16, for "leculinic" read -- levulinic --; line 38, for "the" read -- a --; column 5, line 32, beginning with "Into a reactor" strike out all to and including "was 5.5 hours." in line 36, same column.

Signed and sealed this 6th day of June 1961.

(SEAL)
Attest:

ERNEST W. SWIDER
Attesting Officer

DAVID L. LADD
Commissioner of Patents